Oct. 19, 1937.    W. L. AVERY    2,096,293
VEHICLE WHEEL
Filed July 28, 1936

Inventor:
W. L. Avery
By Glascock Downing & Seebold
Attys.

Patented Oct. 19, 1937

2,096,293

UNITED STATES PATENT OFFICE 2,096,293

VEHICLE WHEEL

William Leicester Avery, Twickenham, England

Application July 28, 1936, Serial No. 93,064
In Great Britain July 24, 1935

3 Claims. (Cl. 301—6)

This invention relates to vehicle wheels.

The invention consists in a vehicle wheel incorporating a brake upon each side of the wheel and having the wheel rim supported by the brake casings.

The invention also consists in a vehicle wheel according to the preceding paragraph wherein the bearings for supporting the wheel upon the hub are located at the outer side of each brake casing.

The invention also consists in a vehicle wheel having the further features hereinafter described and shown in the accompanying drawing.

According to one embodiment as illustrated in the cross sectional drawing a vehicle wheel is provided comprising a rim $a$ which is carried upon vertical annular side plates $b$, $b'$ provided one on each side of the wheel and themselves carried at their inner peripheries upon bearings $c$ on the wheel hub.

The rim has tyre retaining flanges $d$, $d'$ around its side edges whereby the rim may support a pneumatic tyre of the "wire-edge" type, and on one side of the rim the tyre retaining flange $d$ is followed by an inwardly depending annular flange $e$ which is seated upon an outwardly projecting ledge $f$ provided around the outer face of the annular supporting plate $b$ at this side of the wheel and to which plate the rim, at this side of the wheel, is secured by axially disposed bolts $g$, the heads $h$ of which engage in recesses $i$ formed on the rear face of said plate $b$, while the securing nuts $g'$ for these bolts engage the outer face of the said flange $e$. Preferably the inner peripheral surface of the flange $e$ is tapered for engagement with a correspondingly tapered surface of the ledge $f$ such that this flange will automatically tighten upon the ledge as it is secured to the side plate $b$ by the bolts.

Figure 1:
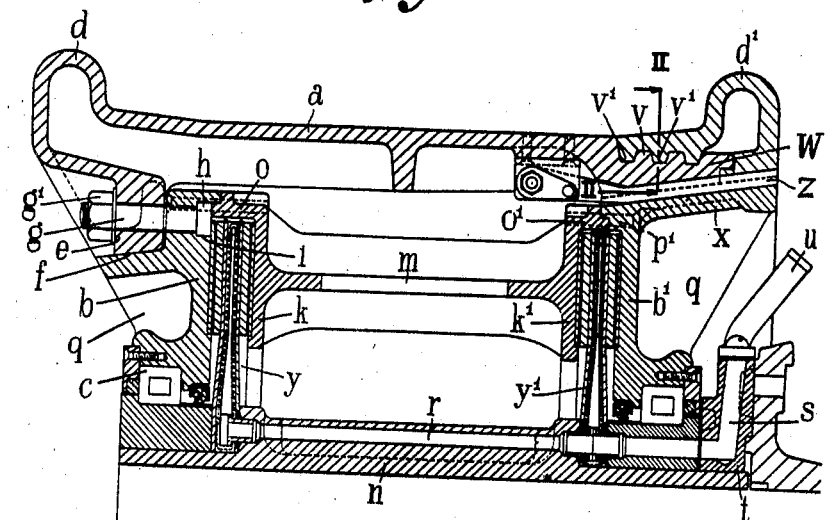
Fig. 1 is a sectional view of a vehicle wheel constructed in accordance with the invention.
Figure 1:
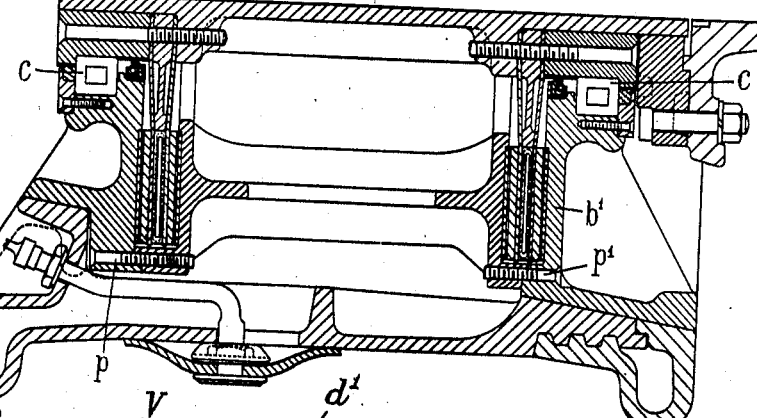
Figure 2:
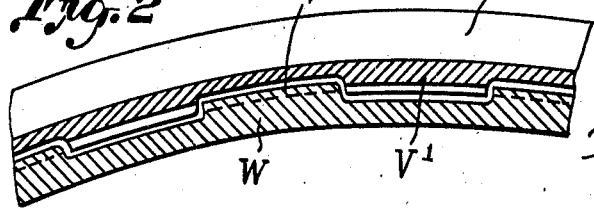
Fig. 2 is a sectional view of the rim taken on the line II—II of Fig. 1.

The tyre retaining flange $d'$ is detachable from the rim by removing the locking pin $z$ when the rim $d'$ may be rotated to move peripherally spaced rings of castellations $v$, $v'$ on the flange and rim out of register with each other as shown in Fig. 2.

The peripheral edge portion $w$ of the rim to which the detachable flange $d'$ is secured is thickened and the inner surface of this thickened rim portion is of conical form as also is the surface of an outwardly extending circumferential flange $x$ on the side plate $b'$, these two conical surfaces corresponding with each other.

The side plates $b$, $b'$ form the outer walls of two brake casings $y$, $y'$ provided one on each side of the wheel. The inner side walls of the brake of the wheel are constituted by vertical annular casings are provided at the ends of a centrally flanges $k$, $k'$ arranged cylindrical web $m$ which is co-axial with the hub $n$ and which flanges $k$, $k'$ are followed at their outer peripheries by outwardly extending circumferential flanges $o$, $o'$ which serve to space the side walls of each brake from each other and from the outer peripheries of the brake casings, the two walls of each brake casing being secured together by screws $p$, $p'$.

The outer side wall of each brake casing may have radial webs $q$ on its outer surface which provide additional support for the forces imposed upon the rim and also promote cooling of the wheel during rotation thereof.

Each brake casing houses a fluid actuated brake to which the fluid is supplied by an axial conduit $r$ in the wheel hub having communication with each brake and communicating at one end with a conduit $s$ formed within an annular plate $t$ secured to the wheel hub on the outside of the side plate $b'$ and having an outwardly directed conduit $u$ for connection with the fluid supply.

I claim:

1. A vehicle wheel comprising a central hub, a member having an annular flange extending radially with respect to said hub, a second member having an annular flange extending radially with respect to the hub and axially spaced from the first flange, a rim having one of its extreme peripheral edges supported upon the first said member and having the other extreme peripheral edge supported upon the second said member, an inner annular flange member spaced from the first said flange to form a brake housing between this flange and the said inner flange, another inner annular flange member spaced from the said second flange to form a brake housing between it and the second flange and bearings supporting the outer walls of the brake housings upon said hub.

2. A vehicle wheel comprising a central hub, a member having an annular flange extending radially from the hub and having an axially and outwardly directed flange near its outer periphery, a bearing interposed between the hub and the inner periphery of said radial flange, a second member having a flange extending radially from the hub and axially spaced from the first such flange, this second member having an outwardly and axially directed flange at its outer periphery, a bearing interposed between the hub and the inner periphery of this second member, an inner radial and annular flange member adjacent the radial flange of each said first two mentioned members and spaced therefrom to form a brake housing within each side wall of the wheel, the side walls being formed by the said outer radial flanges and their adjacent inner radial flanges, and a rim having one of its peripheral edge portions seated upon the said axially and outwardly directed flange of the first said radially flanged member and having its other peripheral edge portion seated upon the outwardly and axially directed flange of the second said radially flanged member.

3. A vehicle comprising a central hub, two axially spaced members each having annular flanges extending radially from the hub, a bearing interposed between the inner periphery of each said flange and the hub, a rim having its extreme peripheral edges seated upon said flanges, a cylindrical web interposed between the hub and the rim and co-axial therewith and having its ends inwardly spaced from the inner surfaces of the said radial flanges, said web having a radial flange at each end thereof spaced from the adjacent first mentioned radial flanges.

WILLIAM LEICESTER AVERY.